United States Patent Office 3,310,378
Patented Mar. 21, 1967

3,310,378
MANUFACTURE OF HYDROGEN PEROXIDE FROM COMPOUNDS WITH AN ANTHRAQUINONE NUCLEUS
André Etienne, Paris, and Georges Izoret, Boulogne, France, assignors to L'Air Liquide, Societe Anonyme pour l'Etude et l'Exploitation des Procedes Georges Claude
No Drawing. Filed Dec. 12, 1962, Ser. No. 244,005
Claims priority, application France, Dec. 21, 1961, 882,735, Patent 1,317,258
2 Claims. (Cl. 23—207)

This invention relates to a new method of preparation of a series of redox compounds with an anthraquinone nucleus, composed of the ethers of 2-hydroxymethyl-anthraquinone and of a non-tertiary alcohol (primary or secondary alcohol). It relates more particularly to the preparation of ethers with the general formula:

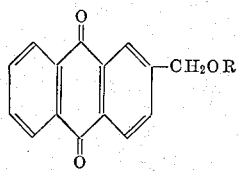

wherein R is a member of the group consisting of alkyl, haloalkyl, hydroxyalkyl, alkoxyalkyl, dihydroxyalkyl, dialkoxyalkyl, arylalkyl, alkenyl and cycloalkyl radicals.

It also relates to novel commercial products i.e. the new ethers of 2-hydroxymethyl-anthraquinone obtained through this method, and to novel methods of preparation of intermediates used in the synthesis of this series of ethers. Finally, it relates to a method for the manufacture of hydrogen peroxide through alternate reductions and oxidations of the ethers of 2-hydroxymethyl-anthraquinone belonging to the above series, wherein the radical of the non-tertiary alcohol cannot be hydrogenated under the conditions of the reaction of hydrogenation of the quinone function.

The application of the usual method of condensation of two alcohols, which would consist in treating 2-hydroxymethyl-anthraquinone with the sulphate of the other alcohol in acetone, in the presence of potash, is only suitable for the preparation of the methyl and ethyl ethers of the above series.

A number of other compounds of this series have been lately prepared with good yields through alcoholysis of 2-anthraquinonyl-methyl toluene-parasulphonate by means of the alcohol to be condensed, through refluxing both compounds in an excess of the chosen alcohol (A. Etienne and J. Camier, C. R. 1960, 251, 100–102). However, 2-anthraquinonyl-methyl toluene-parasulphonate would have to be previously prepared through a series of reactions involving the chlorination or bromination of 2-methyl-anthraquinone into 2-chloromethyl or 2-bromomethyl-anthraquinone, the conversion of this compound to 2-acetoxymethyl-anthraquinone through reaction with sodium acetate and acetic acid, the hydrolysis of 2-acetoxymethyl-anthraquinone into 2-hydroxymethyl-anthraquinone, and finally the condensation of the latter with toluene para-sulphonyl chloride. The above method is therefore comparatively lengthy and involved.

On the other hand, the new process of the present invention makes it possible to obtain the ethers of the above series easily and simply from 2-chloromethyl-anthraquinone, which compound is readily obtained directly from 2-methyl-anthraquinone. The method is characterised in that 2-chloromethyl-anthraquinone is refluxed in a non-basic medium with the appropriate non-tertiary alcohol, preferably above 100° C. The reaction may be written:

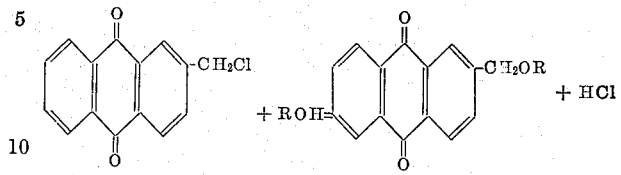

the alkyl radical R being the same as above.

However, the above reaction is comparatively slow at lower temperatures. In practice, the rate of reaction is adequate only above 100° C. For the ethers of alcohols with boiling points below 100° C., it is therefore advisable to carry out the reaction under such pressure as to raise the boiling point above 100° C. The reaction gives excellent yields when the alcohol condensed with 2-hydroxymethyl-anthraquinone is a primary alcohol; the yields are usually less with secondary alcohols, except with some of the latter, such as cyclohexanol.

It should be observed that the addition of basic condensing reagents such as alkalis or pyridine, not only fails to promote the reaction, but makes it impossible to obtain the required ethers. The reaction carried out with a sodium alcoholate or with an alcohol in the presence of solid caustic or sodium carbonate gives a high-melting product (340° C.) which turns out to be 1-2-di(2-anthraquinonyl)-ethane, formed through the union of two 2-anthraquinonyl-methyl radicals. With pyridine as the hydrochloric acid acceptor, there forms N-(2-anthraquinonyl-methyl)pyridinium chloride, which does not react with the alcohol.

Among the ethers prepared through the above method, some are novel compounds: these are the ones where the alcohol condensed with 2-chloromethyl-anthraquinone is 2-chloroethanol, 2-methyl-1-propanol, n-pentanol, 3-methyl-1-butanol, n-octanol, n-dodecanol, allyl alcohol, 2-methoxyethanol, phenylmethanol (benzyl alcohol), 2-phenylethanol or cyclohexanol.

As to 2-chloromethyl-anthraquinone, used as the initial compound in the above condensation, methods are already known for its preparation; the most convenient method appears to be reacting sulphuryl chloride, in the presence of benzoyl peroxide, upon 2-methyl-anthraquinone dissolved in boiling benzene (Bhavsar, Tilak, Venkataraman, J. Sci. Indust. Res. 1957, 16B, 392). This makes it possible to obtain the monochloro derivative selectively, but in 33% yield only. However, it has been found, according to this invention, that the method could be improved through carrying out the reaction in the presence of a radical-producing initiator such as azo-diisobutyronitrile; the solvent can be sulphuryl chloride itself or a third compound, notably carbon tetrachloride. 2-chloromethyl-anthraquinone is then obtained in approximately 70% yield.

On the other hand, if the reaction is continued longer than necessary for the formation of the monochloro derivative, also in the presence of azo-diisobutyronitrile, in sulphuryl chloride or in chlorobenzene at about 90° C., 2-dichloromethyl-anthraquinone is obtained in a good yield (54%).

2-hydroxymethyl-anthraquinone can also be obtained through the hydrolysis of 2-chloromethyl-anthraquinone, according to another improvement of the invention, the latter being refluxed for several hours in a mixture of water and dimethylsulphoxide. As above, the presence of an alkaline reagent, not only fails to promote the reaction, but leads to the formation of the above dimer, di-(2-anthraquinonyl)ethane.

The ethers of the invention may be used as regeneratable intermediates in the manufacture of hydrogen peroxide through alternate reductions and oxidations of a compound with an anthraquinone nucleus, when the radical of the non-tertiary alcohol is not hydrogenated under the conditions of the reaction of hydrogenation of the quinone function. Some of those ethers, compared with the known compounds in general use for the manufacture of hydrogen peroxide, such as alkyl-anthraquinones, have the advantage of being highly soluble in organic solvents, both under the reduced (anthrahydroquinone) form and under the oxidized (anthraquinone) form. This is the case with the ethers of n-butyl alcohol, n-amyl alcohol, 2-ethoxyethanol (marketed under the trade name "Cellosolve"), and 2-(2-ethoxyethoxy) ethanol (marketed under the trade name "Carbitol"). The solubility of the redox intermediate may be further increased through the use of a mixture of two or more of the above ethers.

As non-limitative examples, we give hereafter the procedures for the preparation, according to this invention, of various ethers of 2-hydroxymethyl-anthraquinone, of 2-chloromethyl-anthraquinone, and of 2-hydroxymethyl-anthraquinone, as well as the melting points and solubilities in various solvents of the said ethers, both under the reduced (anthrahydroquinone) and the oxidised (anthraquinone) forms.

EXAMPLE 1

*Preparation of 2-chloromethyl-anthraquinone*

(a) A mixture of 100 parts 2-methyl-anthraquinone, 730 parts sulphuryl chloride and 2.3 parts 2-2'-azo-diisobutyronitrile is refluxed for 10 minutes. The excess sulphuryl chloride is then distilled off and collected for re-use. The precipitate obtained is washed 4 times with 57 parts petroleum ether (B.P. 30°–50° C.), then recrystallized from 7,400 parts ethanol. The yield is 69 parts (60%) of shiny flakes, M.P. 161–162° C. (inst.).

(b) A mixture of 100 parts 2-methyl-anthraquinone, 400 parts sulphuryl chloride, 400 parts carbon tetrachloride and 2.3 parts 2-2'-azo-diisobutyronitrile is refluxed until incipient crystallization. The course of the reaction may be followed through measuring the melting point of samples. Upon cooling, the product precipitates. It is washed 4 times with 57 parts petroleum ether (B.P. 30°–50° C.) and dried. It may be purified through recrystallizing from ethanol. The yield is 80 parts (69%), M.P. 161°–162° C. (inst.).

From the carbon tetrachloride-sulphuryl chloride solution, a mixture of crystals is recovered which may be re-used for another chlorination.

EXAMPLE 2

*Preparation of 2-hydroxymethyl-anthraquinone*

1 part 2-chloromethyl-anthraquinone is dissolved in 160 parts of a mixture of 60 parts dimethylsulphoxide and 100 parts water and refluxed until the reaction is over (20 h.); the course of the reaction may be followed through the measurement of melting points. Upon cooling, the alcohol precipitates. It is washed with water, dried and recrystallized from benzene. The yield is 0.74 part (80%), M.P. 193° C. (inst.).

EXAMPLE 3

*Preparation of ethers of 2-hydroxymethyl-anthraquinone*

Generally speaking, a mixture of 1 part 2-chloromethyl-anthraquinone and 10 parts alcohol or more is refluxed under normal or elevated pressure for a time which varies with the boiling point of the alcohol: 20 to 40 h. under normal pressure for alcohols boiling around 200° C., 200 h. or more for alcohols boiling around 100° C., 20 h. at 140° C. under elevated pressure for low-boiling alcohols.

The course of the reaction is followed through the measurement of the melting point of crystals obtained through evaporating an aliquot of the solution; the melting point gradually decreases from that of 2-chloromethyl-anthraquinone to that of the ether.

To get the product in the crystalline form, the excess solvent is distilled off under vacuum, if sufficiently volatile, or diluted with water if sufficiently miscible, or else precipitated with petroleum ether. In some cases, the product crystallizes out spontaneously in the cold.

The crystals are recrystallized from methanol or ethanol. The yield is 50% to 90%.

(a) *Preparation of the methyl ether* ($R=CH_3$).—In a pressure-proof vessel, a mixture of 100 parts 2-chloromethyl-anthraquinone and 2,000 parts methanol is heated at 140° C. for 20 h. After the reaction is over, the excess methanol is distilled off. The yield is 92 parts methyl oxide. This is purified through crystallizing from 4,000 parts methanol. The yield is 71 parts (72%), M.P. 134° C. (inst.).

(b) *Preparation of the n-butyl ether* ($R=CH_2-CH_2-CH_2-CH_3$).—A mixture of 100 parts 2-chloromethyl-anthraquinone and 800 parts n-butanol is refluxed for 100 hours. The solution is then cooled, and the magma is treated with water. The crystals are filtered, washed and dried. The yield is 113 parts (98%), M.P. 90° C. (inst.). The product is of high purity and needs no further purifying.

(c) *Preparation of ether of the 2-methoxy-ethanol or "Methyl Cellosolve"* ($R=CH_2-CH_2-OCH_3$).—100 parts 2-chloromethyl-anthraquinone and 800 parts "Methyl Cellosolve" are refluxed for 150 hours as above. The mixture is poured into water and the precipitate is washed with water and dried. The yield is 106 parts (92%), M.P. 85° C. (inst.) after recrystallizing from methanol.

(d) *Preparation of ether of the 2-(2-ethoxy ethoxy) ethanol or "Carbitol"* ($R=CH_2-CH_2-O-CH_2-CH_2-O-CH_2-CH_3$).—100 parts 2-chloromethyl-anthraquinone and 800 parts "Carbitol" are refluxed for 25 hours as above. The mixture is poured into water and the product is filtered, washed with water and dried. The yield is 120 parts (87%). After recrystallizing from methanol, the melting point is 64° C.

(e) *Preparation of the cyclohexyl ether* ($R=C_6H_{11}$).—100 parts 2-chloromethyl-anthraquinone and 480 parts cyclohexanol are refluxed for 160 hours. The solution is cooled and the precipitate is slurried in 480 parts petroleum ether (B.P. 300°–50° C.), filtered, washed three times with 100 parts petroleum ether and dried. The product is purified through recrystallizing in 2,00 parts methanol. The yield is 70 parts (56%), M.P. 101° C. (inst.).

EXAMPLE 4

Utilization of the ethers of 2-hydroxymethyl-anthraquinone as intermediates in the manufacture of hydrogen peroxide.

The solubilities of various ethers was established, first under the quinone form, then under the hydroquinone form, in solvents frequently used for dissolving anthraquinone derivatives in the manufacture of hydrogen peroxide. The trials were made by dissolving the ether in the minimum amount of warm solvent, then cooling the solution to room temperature, so as to enable the insoluble excess to crystallize out. The operation was repeated with addition of successive increments of solvent, until the compound was entirely dissolved at room temperature. To avoid supersaturation, the solution was left standing for several hours in the presence of crystal germs before the possible crystallization is observed.

The solubility of the hydroquinone form was established only for anthraquinones more soluble than 2-ethyl-anthraquinone, the compound generally used as intermediate in the manufacture of peroxide, and of course in the cases where the side chain could not be hydrogenated, which excluded ethers with alkenyl radicals.

To this end, the saturated solution of the quinone form was subjected to catalytic hydrogenation (in the presence of 0.6% palladium on alumina) up to the absorption of the theoretical amount of hydrogen corresponding to the formation of the hydroquinone; in most cases, the dihydrogenated derivative precipitated. The hydrogenation of the quinone form was repeated after addition of known amounts of solvent, until the dihydrogenated derivative was entirely dissolved.

The following table shows the instantaneous melting points and solubilities of various ethers prepared according to the method of the invention. ("L Solvent" means a mixture of methylcyclohexyl acetate and xylene in equal amounts.)

For comparative purposes, the solubilties of 2-ethyl-anthraquinone and 2-ethyl-anthrahydroquinone are the following in some of the same solvents:

| Solvent | Solubilities (moles/litre solvent) | |
|---|---|---|
|  | 2-ethyl-anthra-quinone | 2-ethyl-anthra-hydro-quinone |
| Heptyl acetate | 0.34 | 0.20 |
| "L solvent" | 0.56 | 0.20 |
| n-Butyl oxide | 0.11 | 0.04 |

2-hydroxymethyl-anthraquinone is sparsely soluble in "L solvent" (less than 0.20 moles/litre solvent).

The precise meaning of "n-butyloxide" is "n-butylether" or "di n-butyl ether," with the formula:

$$CH_3-(CH_2)_3-O-(CH_2)_3-CH_3$$

Concerning the subsequent use herein of "benzyl-oxide" the precise meaning is the "benzyl ether" or "dibenzyl ether" with the formula:

$$C_6H_5-CH_2-O-CH_2-C_6H_5$$

TABLE.—Ethers of 2-hydroxymethyl-anthraquinone and various alcohols

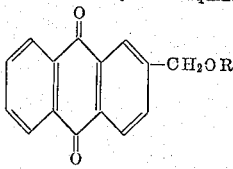

| Alcohol | R | M.P., °C. | Solvent | Solubilities (moles/litre solvent) | |
|---|---|---|---|---|---|
|  |  |  |  | Oxidized form | Reduced form |
| Methanol | $CH_3$ | 134 | L solvent | 0.20 | 0.20 |
|  |  |  | n-Butyl oxide | 0.07 | 0.07 |
| Ethanol | $C_2H_5$ | 117 | L solvent | 0.20 | 0.20 |
|  |  |  | n-Butyl oxide | 0.06 | 0.06 |
| 2-chloro-ethanol | $C_2H_4Cl$ | 102 | Heptyl acetate | 0.10 | Low |
|  |  |  | L solvent | 0.33 | 0.25 |
|  |  |  | Anisole | 1 | 0.20 |
|  |  |  | Benzyl oxide | 0.77 | 0.20 |
| Allyl | $CH_2-CH=CH_2$ | 92 | L solvent | 0.50 | (¹) |
| n-Propanol | $C_3H_7$ | 92 | Heptyl acetate | 0.50 | 0.33 |
| 2-methoxy-ethanol (Methyl Cellosolve) | $C_2H_4OCH_3$ | 85 | Heptyl acetate | 0.46 | 0.43 |
|  |  |  | L solvent | 0.43 | 0.36 |
|  |  |  | Anisole | 1.55 | <0.60 |
| n-Butanol | $n-C_4H_9$ | 90 | Heptyl acetate | 0.50 | 0.28 |
|  |  |  | L solvent | 0.67 | 0.17 |
| Isobutyl alcohol | $i-C_4H_9$ | 106.5 | Heptyl acetate | 0.15 | Low |
|  |  |  | L solvent | 0.18 | Low |
|  |  |  | Anisole | 0.83 | <0.66 |
| 2-ethoxy-ethanol (Ethyl Cellosolve) | $C_2H_4OC_2H_5$ | 84 | Heptyl acetate | 0.48 | 0.49 |
|  |  |  | Diisobutyl ketone | 0.31 | >0.35 |
| n-Pentanol | $n-C_5H_{11}$ | 98 | L solvent | 0.50 | 0.33 |
|  |  |  | Heptyl acetate | 0.50 | 0.40 |
|  |  |  | Anisole | 2.63 | <0.20 |
|  |  |  | Benzyl oxide | 1 | <0.20 |
|  |  |  | Amyl acetate | 0.50 | 0.40 |
| Isoamyl alcohol | $i-C_5H_{11}$ | 96 | L solvent | 0.67 | 0.40 |
|  |  |  | Heptyl acetate | 0.50 | 0.40 |
|  |  |  | Anisole | 2 | 0.20 |
|  |  |  | Amyl acetate | 0.50 | 0.40 |
| 2-(2-ethoxy-ethoxy)ethanol(Carbitol) | $(C_2H_4O)_2C_2H_5$ | 64 | Heptyl acetate | 0.56 | 0.64 |
|  |  |  | L solvent | 0.80 | 0.53 |
|  |  |  | Amyl acetate | 0.57 | 0.47 |
|  |  |  | Anisole | 2.5 | <0.81 |
|  |  |  | Anisole + heptyl acetate (1/1) | 1.4 | 1.04 |
|  |  |  | Benzyl ether of Carbitol | 0.77 | Low |
|  |  |  | Benzyl oxide | 1.66 | <1 |
|  |  |  | Diisobutyl ketone | 0.40 | >0.22 |
| n-Heptanol | $C_7H_{15}$ | 82 | Heptyl acetate | 0.23 | Low |
|  |  |  | L solvent | 0.54 | <0.42 |
|  |  |  | n-Heptyl and benzyl ether | 0.36 | Low |
|  |  |  | Anisole | 1.11 | Low |
| n-Octanol | $C_8H_{17}$ | 77 | L solvent | 0.40 | <0.25 |
|  |  |  | Heptyl acetate | 0.15 | Low |
|  |  |  | Anisole | 0.66 | <0.20 |
|  |  |  | Benzyl oxide | 0.40 | <0.20 |
| n-Dodecanol | $C_{12}H_{25}$ | 82 | Heptyl acetate | 0.10 | Low |
|  |  |  | L solvent | 0.16 | Low |
| Cyclohexanol | $C_6H_{11}$ | 101 | Anisole | 0.40 | <0.20 |
|  |  |  | L solvent | 0.15 | Low |
|  |  |  | Anisole | 1 | <0.20 |
|  |  |  | Heptyl acetate | 0.18 | Low |
|  |  |  | Benzyl oxide | 0.66 | <0.20 |
| Benzyl | $CH_2-C_6H_5$ | 116 | L solvent | <0.10 | Low |
|  |  |  | Heptyl acetate | <0.10 | Low |
|  |  |  | Anisole | 0.84 | 0.20 |
| Phenyl ethanol | $C_2H_5-C_6H_5$ | 76 | L solvent | 0.50 | <0.20 |
|  |  |  | Heptyl acetate | 0.22 | <0.20 |
|  |  |  | Anisole | 2.22 | <0.20 |

¹ Hydrogenation to propyl ether.

The ethers of n-butyl alcohol, n-amyl alcohol, 2-methoxy-ethanol ("Cellosolve") and 2-(2-ethoxyethoxy)ethanol (Carbitol) have higher solubilities than 2-ethyl-anthraquinone. Notably, the ether of "Carbitol" has significant advantages over 2-ethyl-anthraquinone as intermediate in the manufacture of peroxide. Under the hydroquinone form, its solubility in heptyl acetate is more than three times that of 2-ethyl-anthraquinone. Its use instead of 2-ethyl-anthraquinone makes it therefore possible, with an installation of given capacity, to triple the output of hydrogen peroxide.

Finally, the yield of peroxide with the above ethers was ascertained as follows. A solution of 1 millimole ether in the chosen solvent, which should theoretically give 1 millimole hydrogen peroxide, was hydrogenated in the presence of 100 mg. catalyst (0.6% palladium on alumina) until the hydroquinone was formed (which corresponds to the adsorption of 1 millimole hydrogen, i.e. about 24 cc. at 20° C.). The catalyst was then separated through filtration in an atmosphere of hydrogen, and the solution of hydroquinone was reoxidized through air bubbling. The hydrogen peroxide was extracted from the solution through washing with three 10-cc. portions of distilled water, then determined with a 0.1 N potassium permanganate solution. The organic solution of the quinone form of the ether was then evaporated to dryness, and its identity with the initial product established. For all the ethers, the yield of hydrogen peroxide was between 90% and 100%.

What we claim is:

1. A method for the manufacture of hydrogen peroxide through alternate reductions and oxidations of at least one compound having an anthraquinone nucleus, characterized in that the said compound is an ether of 2-hydroxymethyl-anthraquinone and of a non-tertiary alcohol the radical of which cannot be hydrogenated under the conditions of the hydrogenation of the quinone function, said ether having the general formula:

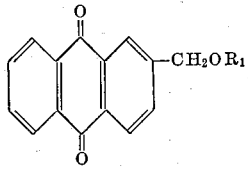

wherein $R_1$ is a residue of a non-tertiary alcohol and is a member selected from the group consisting of saturated alkyl, haloalkyl, hydroxyalkyl, alkoxyalkyl, dihydroxyalkyl, dialkoxyalkyl, arylalkyl and cycloalkyl radicals.

2. A method for the manufacture of hydrogen peroxide through alternate reductions and oxidations of at least one compound having an anthraquinone nucleus, characterized in that the said compound is an ether of 2-hydroxymethyl-anthraquinone and of a non-tertiary alcohol the radical of which cannot be hydrogenated under the conditions of the hydrogenation of the quinone function.

References Cited by the Examiner

UNITED STATES PATENTS

| | | | |
|---|---|---|---|
| 1,899,304 | 2/1933 | Bayer | 260—384 |
| 1,914,872 | 6/1933 | Smith et al. | 260—384 |
| 2,642,444 | 6/1953 | Randall et al. | 260—383 |
| 2,927,002 | 3/1960 | Le Feuvre | 23—207 |
| 2,940,833 | 6/1960 | Le Feuvre et al. | 23—207 |
| 3,014,930 | 12/1961 | Muenster et al. | 260—383 |

OSCAR R. VERTIZ, *Primary Examiner.*

MAURICE A. BRINDISI, *Examiner.*

O. F. CRUTCHFIELD, *Assistant Examiner.*